United States Patent

[11] 3,522,799

| [72] | Inventor: | William K. Gauthier |
| | | 310 Codifer Boulevard, Metairie, Louisiana 70005 |
| [21] | Application No.: | 647,827 |
| [22] | Filed: | June 21, 1967 |
| [45] | Patented: | Aug. 4, 1970 |

[54] SURGICAL RETRACTOR DEVICE
29 Claims, 18 Drawing Figs.

[52] U.S. Cl. .................................................. 128/20
[51] Int. Cl. .................................................. A61b 17/02
[50] Field of Search ................................. 128/20, 3, 12-16, 341

[56] References Cited
UNITED STATES PATENTS

| 1,157,202 | 10/1915 | Bates et al ................ | 128/20 |
| 1,707,689 | 4/1929 | Sloan ........................ | 128/20 |
| 1,747,799 | 2/1930 | Straus ....................... | 128/20 |
| 1,963,173 | 6/1934 | Morin ........................ | 128/20 |
| 2,013,892 | 9/1935 | Lucas ........................ | 128/20 |
| 3,040,739 | 6/1962 | Grieshaber ................ | 128/20 |
| 3,168,093 | 2/1965 | Gauthier ................... | 128/20 |

FOREIGN PATENTS

| 12,990 | 4/1929 | Australia Ludbrooke | 128/20 |
| 1,019,217 | 10/1952 | France ...................... | 128/20 |
| 446,439 | 3/1949 | Italy .......................... | 128/20 |

Primary Examiner— Richard A. Gaudet
Assistant Examiner— Kyle L. Howell
Attorney—Shoemaker and Mattare

ABSTRACT: Four sections or arm means of similar construction are slidably interconnected to form a frame means. A pair of independent support means is slidably supported on each section or arm means and held in place by detent means. Each support means has a recess formed therein which slidably receives a support arm which is held in place by detent means. A retractor blade is mounted on each support arm for pivotal movement and vertical adjustment with respect thereto.

INVENTOR
William K. Gauthier
BY Shoemaker and Mattare
ATTORNEYS

Patented Aug. 4, 1970

INVENTOR
William K. Gauthier

BY Shoemaker and Mattare
ATTORNEYS

U.S. PATENT 3,522,799
SURGICAL RETRACTOR DEVICE

BACKGROUND OF THE INVENTION

The present invention relates to a retractor device for use for example in abdominal, thoracic or cardiac surgery to produce traction in any particular direction and which will properly retain the engaged tissue surrounding an incision during the performance of surgery on a patient.

Retractor devices such as are conventional and well known in the prior art include means for positioning generally U-shaped hook members in an incision for holding the tissue in retracted position. The versatility of these prior art constructions is severely limited firstly because the U-shaped hook members are fixed to the associated arms on which they are supported so that the position of these hook members cannot be varied to conform to the configuration of different shaped incisions.

The hook members are so mounted such that the angular and vertical position of the hook members with respect to the associated support arms cannot be varied, and with this type of arrangement there is no way in which the position of a plurality of tissue-engaging retractor blades can be adjusted around all sides of an incision.

Additionally, with this type of prior art arrangement wherein the apparatus comprises a bulky metallic structure, it is difficult to sterilize the apparatus and difficult to make the adjustments possible with the apparatus.

The hook members employed with this type of prior art arrangement are undesirable since tissue necrosis often occurs due to the fact that a relatively small area of contact is provided with the associated tissues thereby concentrating the force applied to the tissue. Furthermore, since the hook member construction is rigid, this further contributes to tissue necrosis since there is no flexibility built into the retractor structure.

Furthermore, when this type of prior art arrangement is employed for retracting tissue around various sides of an incision, unequal forces are applied to the tissues which is undesirable.

SUMMARY OF THE INVENTION

In the arrangement of the present invention, a plurality of spaced frame sections or arm means are provided which are adjustably interconnected with one another. Each retractor blade is mounted upon a support arm which in turn is adjustably supported by a support means which is movable along an associated section or arm of the frame means to different adjusted positions. With this arrangement, the support means and the associated support arm and blade means can be adjusted into any desired position.

These adjustments can be made in a very simple and effective manner in the present invention, and the angularity of each blade means is automatically adjustable to conform to the configuration of the tissues within which it is engaged.

Accordingly, the retractor means is adjustable around all sides of the associated incision. The retractor blade means provides a large surface of contact with the associated tissues to thereby avoid tissue necrosis, and the blade means are further adjustable in a vertical direction so as to enable adjustment to the optimum position.

The lower terminal ends of the blades are also of a flexible construction so as to provide built-in resilience to the blade means to further reduce any possible tissue necrosis.

With the arrangement of the present invention, an equal or balanced traction force may be provided substantially all the way around an incision to provide the most beneficial results.

A further particular advantage of the present invention is the fact that all of the various components thereof may be formed of plastic. This provides a relatively inexpensive lightweight construction, and furthermore provides a throwaway arrangement wherein the various components may be provided in a sterile package, then assembled in operative position, and once used thrown away thereby eliminating the sterilizing problem now encountered with prior art arrangements.

BRIEF DESCRIPTION OF THE DRAWINGS

FIG. 14 is a section through a modified form of frame or arm means;

FIG. 15 is a top perspective view of a modified form of connecting means employed for interconnecting two adjacent sections or arm means of a frame means;

FIG. 16 is a top view of a modified form of support means illustrating it in its relaxed condition;

FIG. 17 illustrates the support means shown in FIG. 16 mounted in operative position within a modified form of frame or arm means; and FIG. 18 is a view partly in section through a further modified form of the invention.

DESCRIPTION OF THE PREFERRED EMBODIMENTS

Figure 1:
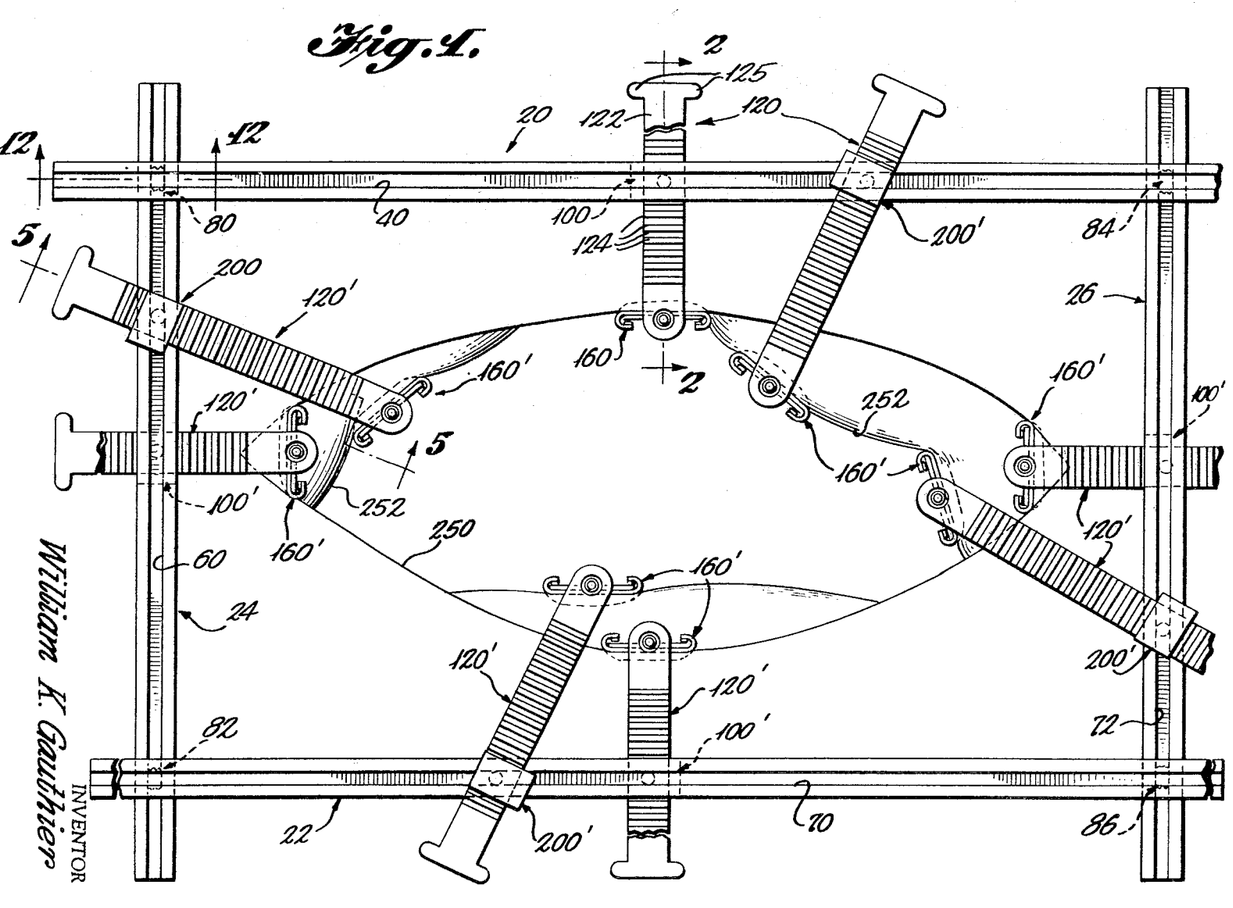
FIG. 1 is a top view of a retractor device according to the present invention illustrating the retractor device mounted in operative position relative to an incision during an operation.

Referring now to the drawings wherein like reference characters designate corresponding parts throughout the several views, the over-all retractor device is illustrated in FIG. 1 and includes four sections or arm means indicated generally by reference numerals 20, 22, 24 and 26. The two sections or arm means 20 and 22 are disposed in spaced parallel relationship to one another, and the two sections or arm means 24 and 26 are disposed in spaced parallel relationship to one another and extend generally perpendicularly to the first-mentioned arm means. The various arm means are interconnected with one another in the position illustrated as hereinafter described, and as shown the two arm means 20 and 22 overlie the arm means 24 and 26, although this relationship could be reversed if so desired.

Figures 2, 3, 4:
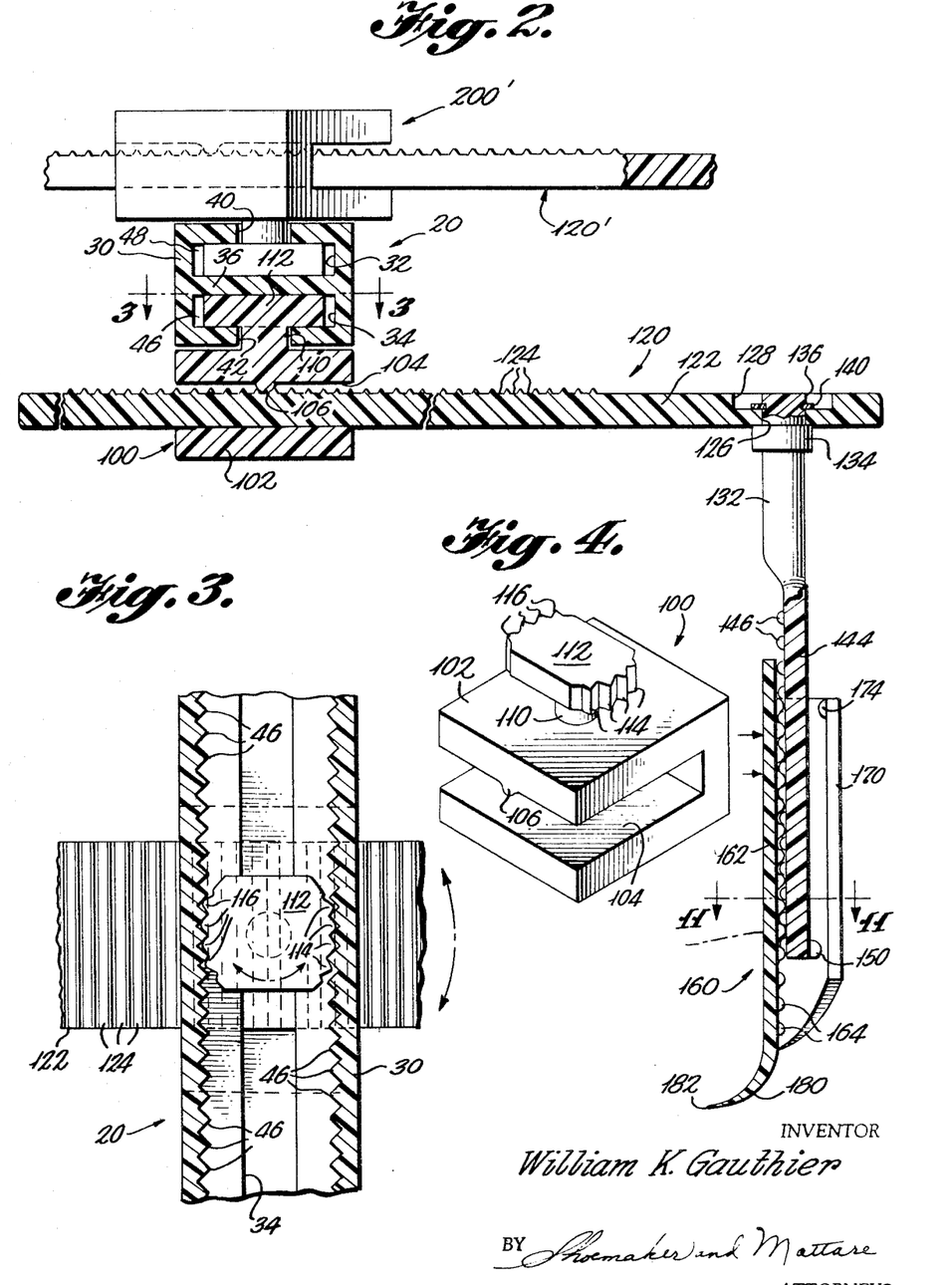
FIG. 2 is a sectional view taken substantially along line 2-2 of FIG. 1 looking in the direction of the arrows.
FIG. 3 is a sectional view taken substantially along line 3-3 of FIG. 2 looking in the direction of the arrows.
FIG. 4 is a top perspective view of the support means associated with the lower cavity in one of the sections or arm means of the frame means.

Referring particularly to FIG. 2 of the drawings, the cross sectional construction of the section or arm means 20 is illustrated. This arm means includes a body 30 formed of plastic or a similar substance, and it should be understood that all the components of the apparatus of the present invention may be formed of a suitable plastic substance which can be readily sterilized and pre-packaged and further which is sufficiently inexpensive so as to be thrown away after use.

Body portion 30 of arm means 20 is provided with a pair of longitudinally extending cavities 32 and 34 which are separated from one another by a central transversely extending wall 36 formed integral with the arm means. Cavities 32 and 34 are in communication with longitudinally extending slots 40 and 42 respectively which are co-extensive in length with the cavities and which open through the upper and lower surfaces of the arm means. Both the cavities and the slots open through opposite ends of the associated arm means.

As seen most clearly in FIG. 3, the body means includes integral teeth 46 of generally triangular cross sectional configuration which extend inwardly from opposite sides of the cavity 34, these teeth serving as detent means as hereinafter described.

The body means is also provided with a plurality of integral teeth 48 extending into opposite sides of the cavity 32, teeth 48 being identical in construction to the teeth 46. These teeth 48 also serve as detent means as hereinafter described.

Figures 5, 6, 7, 8:
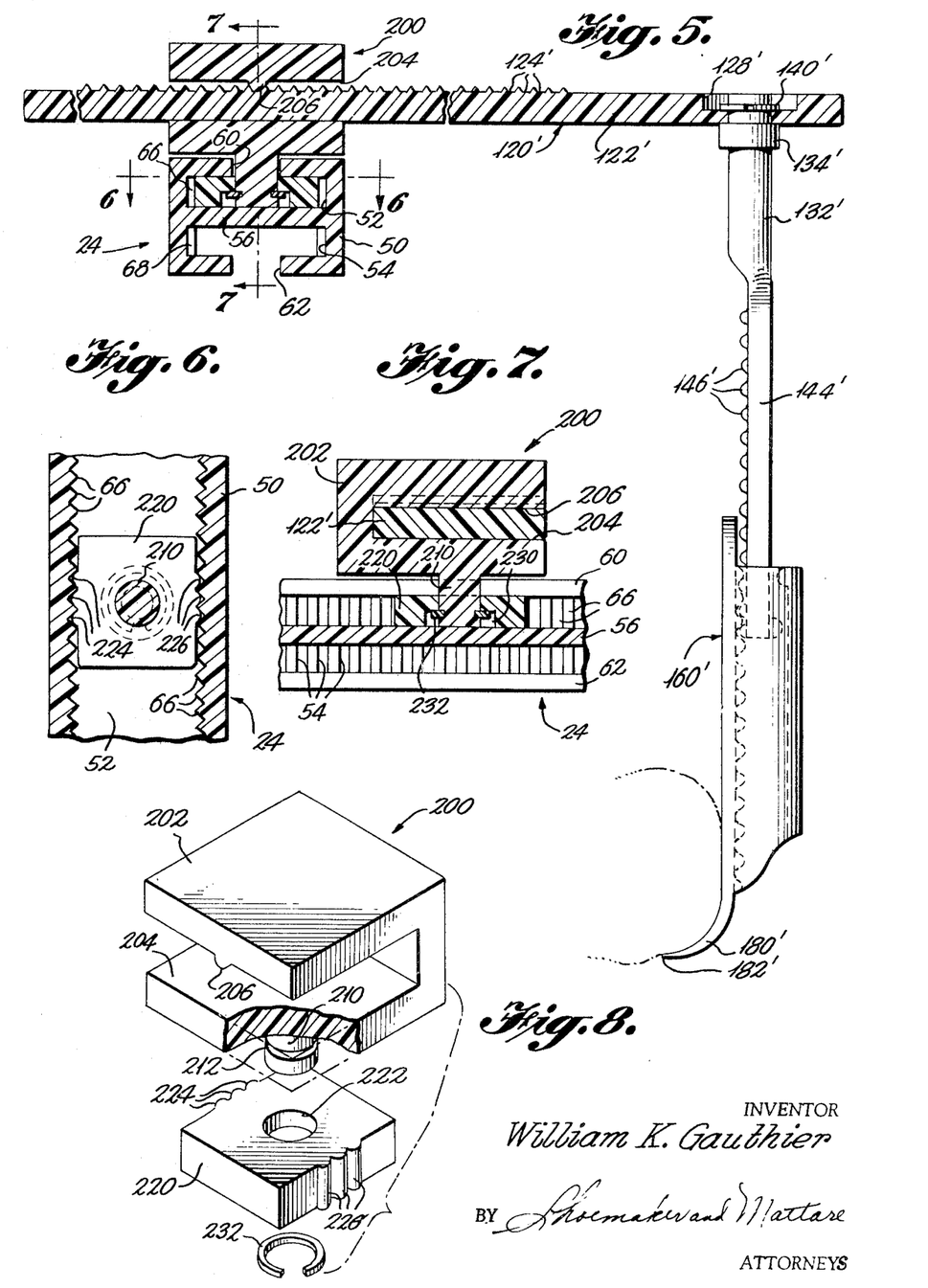
FIG. 5 is a sectional view taken substantially along line 5-5 of FIG. 1 looking in the direction of the arrows.
FIG. 6 is a sectional view taken substantially along line 6-6 of FIG. 5 looking in the direction of the arrows.
FIG. 7 is a sectional view taken substantially along line 7-7 of FIG. 5 looking in the direction of the arrows.
FIG. 8 is a top perspective exploded view partly broken away illustrating the support means associated with the upper cavity of one of the sections or arm means of the frame means.
Figures 9, 10, 11, 12, 13:
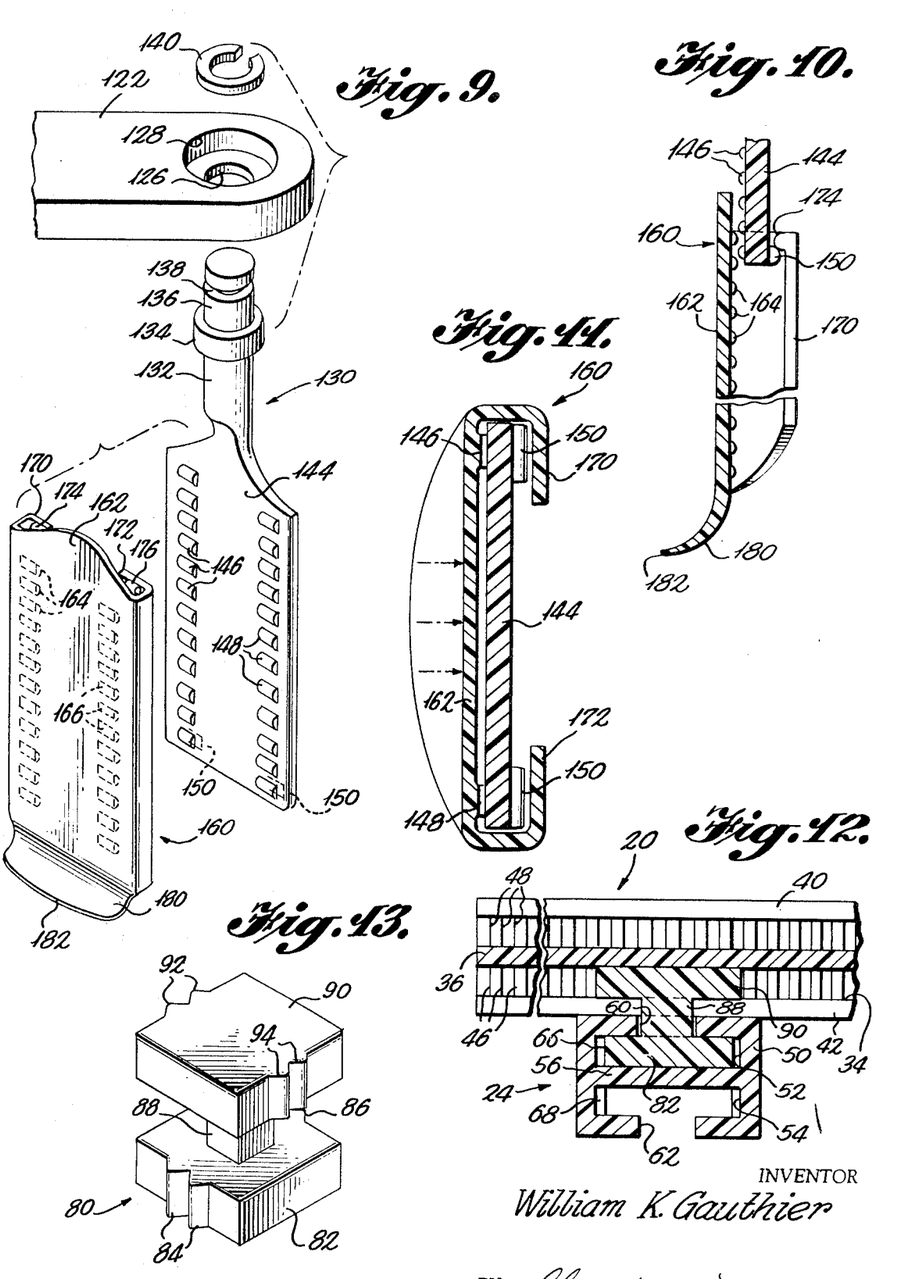
FIG. 9 is a top perspective exploded view illustrating the construction of a depending portion of a support arm and the associated blade means.
FIG. 10 is a view partly broken away illustrating a limit position of the retractor blade means with respect to the associated depending portion of a support arm.
FIG. 11 is a sectional view taken substantially along line 11-11 of FIG. 2 looking in the direction of the arrows.
FIG. 12 is a sectional view taken substantially along line 12-12 of FIG. 1 looking in the direction of the arrows.
FIG. 13 is a top perspective view of the connecting means employed for interconnecting two adjacent arm means.

Referring now to FIGS. 5 and 12, the cross sectional construction of a section or arm means 24 is illustrated. The cross sectional construction of this arm means is substantially identical with that of arm means 20, and in fact each of the arm means is of similar construction, it being understood that both arm means 22 and 26 will have a similar cross sectional configuration.

Arm means 24 includes a body portion 50 formed of a suitable plastic or similar material defining upper and lower longitudinally extending cavities 52 and 54 separated from one another by a central transversely extending wall portion 56. Longitudinally extending slots 60 and 62 opening through the upper and lower surfaces of arm means 24 are in communication with cavities 52 and 54 respectively. Both the cavities and the slots open through opposite ends of the arm means.

As seen most clearly in FIG. 6, body portion 50 includes a plurality of integral inwardly extending teeth 66 extending into opposite sides of cavity 52 to serve as detent means as hereinafter described. As seen in FIG. 5, body means 50 also includes integral inwardly extending teeth 68 which extend longitudinally throughout the length of cavity 54, these latter teeth also serving as detent means as hereinafter described.

As seen in FIG. 1, the sections or arm means 22 and 26 are provided with slots 70 and 72 opening through the upper surfaces thereof, these slots corresponding to the slots 40 and 60 previously described.

Referring now to FIG. 13, a connecting means is indicated generally by reference numeral 80, this connecting means also being formed of plastic and preferably comprising a one-piece construction. The connecting means includes a lower generally rectangular portion 82 having teeth 84 and 86 extending from opposite sides thereof. This lower portion is connected by a post means 88 of generally square cross sectional configuration with an upper portion 90 of similar configuration to the lower portion 82. Upper portion 90 has teeth 92 and 94 formed integrally at opposite sides thereof and projecting outwardly therefrom. It will be noted that the teeth formed on upper portion 90 are on the two sides thereof disposed at right angles to the two sides of the lower portion on which the teeth 84 and 86 are formed.

The dimensions of the connecting means are such that the lower portion 82 is adapted to fit within one of the longitudinal cavities of an arm means, the upper portion 90 being of a similar dimension. The intermediate post means 88 is of such a dimension as to be slidably received within the slots formed in the arm means.

Referring now to FIG. 12, the connecting means is illustrated as being mounted in its operative position for interconnecting two adjacent sections or arm means 20 and 24.

As seen in this figure, the lower portion 82 of the connecting means is received within the cavity 52 of arm means 24, the teeth formed at opposite sides of lower portion 82 of the connecting means being interengaged with the teeth 66 extending into cavity 52. It should be understood that the interengagement of the teeth will retain the connecting means and the arm means in a particular relative position, yet the plastic or other material from which these components are formed is sufficiently flexible to enable the members to be moved relative to one another when sufficient force is applied so that it is possible to adjust the position of the connecting means with respect to the associated arm means when it is desired to alter the relative relationship of the associated arm means.

The post means 88 extends upwardly through the upper slot 60 of arm means 24 and through the lower slot 42 of arm means 20, the upper portion 90 of the connecting means being disposed within the cavity 34 of arm means 20. The teeth formed on the opposite sides of the upper portion 90 of the connecting means will be interengaged with the teeth 46 extending into cavity 34.

It is apparent that with the connecting means disposed in the operative position shown in FIG. 12, the arm means 20 and 24 will be held in the particular interrelationship shown. However, if it is desired to alter the position of arm means 20 and 24 with respect to one another, they can be forceably moved into a different relative position, the connecting means serving to hold the arm means in any desired interrelationship.

Referring again to FIG. 1, connecting means 80 is indicated as being in operative position for interconnecting arm means 20 and 24. A similar connecting means 82 serves to interconnect arms 22 and 24. Further connecting means 84 and 86 are provided for interconnecting arm means 20 and 26 and arm means 22 and 26 respectively.

Referring now to FIGS. 2 and 4 of the drawings, a first form of support means is illustrated, this support means being preferably employed with the lower cavity of each of the arm means for a reason hereinafter discussed. This support means indicated generally by reference numeral 100 includes a body means 102 formed of a suitable plastic material and preferably being of a one-piece construction. The body means has a recess 104 formed therein for receiving a support arm hereinafter described. A detent means in the form of a depending rib 106 is formed integral with body portion 102 and extends downwardly into the recess, this rib extending completely across the width of the recess.

An integral post portion 110 extends upwardly from the upper portion of the body portion and an enlarged head 112 is formed at the upper end of post portion 110. This head 112 has a plurality of teeth 114 formed on one side thereof and a similar plurality of teeth 116 formed on the opposite side thereof. As seen most clearly in FIG. 3, teeth 114 as well as teeth 116 are formed so that the outer extremities thereof lie on an arc.

With the construction shown in FIG. 3, it will be noted that in the position shown, the teeth 114 and 116 are adapted to engage the teeth 46 extending into opposite sides of cavity 34 to thereby hold support means 100 in the adjusted position illustrated.

If it is desired to move the support means with respect to the associated arm means, the support means may be rotated 90 degrees from the position illustrated so that the teeth 114 and 116 no longer engage the teeth 46 of the arm means, and the head portion 112 will then be adapted to readily move longitudinally with respect to recess 34 to adjust the support means to a new operative position. When the support means is in the desired adjusted position, the support means may again be rotated 90 degrees back into the full line position shown in FIG. 3, whereupon the interengaging teeth will serve to hold the support means in desired operative position relative to the associated arm means. It is apparent that the fact that the outer ends of teeth 114 and 116 are formed on an arc facilitates movement of the teeth into and out of interengagement with one another.

As seen most clearly in FIG. 2, a support arm indicated generally by reference numeral 120 includes a first portion 122 having a plurality of transverse recesses 124 formed in the upper surface which are adapted to receive the detent rib 106 provided in support means 100 for holding the support arm in adjusted position relative to the support means. This portion 122 of the support arm is adapted to slide within the recess 104 formed in the support means. As seen most clearly in FIG. 1, the outer end of portion 122 of the support arm is provided with laterally extending ears 125 which facilitate manual grasping of the support arm to move it with respect to the associated support means.

Referring now to FIGS. 2 and 9, the opposite or inner end of portion 122 of the support arm has a cylindrical hole 126 formed therethrough which is counterbored as indicated at 128 to provide an opening for supporting the depending portion of the support arm as hereinafter described.

The depending portion of the support arm is indicated generally by reference numeral 130 and includes a substantially cylindrical shank portion 132 having an enlarged annular collar 134 formed therearound. An upwardly extending cylindrical portion 136 is received within hole 126 and is adapted to rotate with respect thereto. A circumferentially extending groove 138 formed in portion 136 is adapted to receive a split ring 140 for supporting the depending portion of the support arm in operative position as illustrated in FIG. 2 wherein the upper end of portion 136 and the split ring 140 are disposed within the counterbored portion 128 of the support arm.

As seen most clearly in FIGS. 2, 9, 10 and 11, the depending portion 130 includes an enlarged flattened portion 144 having two rows of spaced detent projections 146 and 148 extending from one surface thereof. A pair of limit stop detent projections 150 extend from the opposite surface of portion 144.

A retractor blade means is indicated generally by reference numeral 160 and includes a tissue engaging portion 162 having two rows of spaced detent projections 164 and 166 extending from the inner surface thereof, these detent projections being adapted to engage the detent projections 146 and 148 previously described for holding the retractor blade means in adjusted position relative to the depending portion of the support arm.

As seen particularly in FIGS. 9 and 11, the retractor blade means includes opposite edge portions 170 and 172 folded back upon themselves to define two channel portions within which the opposite edge portions of portion 144 of the depending portion of the support arm are adapted to be movably mounted. Detent projections 174 and 176 extend inwardly from the upper ends of portions 170 and 172 respectively, and as seen most clearly in FIG. 10, these detent projections are adapted to engage the detent projections 150 formed on part 144 of the support arm for limiting downward movement of the retractor blade means with respect to the associated support arm.

The relationship and dimensions of the components are such that when the retractor blade means is in the position shown in FIG. 10 relative to the depending portion of the support arm, the retractor blade means may be readily adjusted upwardly and downwardly to accommodate the tissues with which it is to be engaged. When the retractor blade means has been properly vertically adjusted, and pressure is applied thereto as indicated by the arrows in FIGS. 2 and 11, the retractor blade means is moved to the right with respect to the support arm as seen in these figures to interengage the detent projections 146 and 164 as well as projections 148 and 166 thereby holding the retractor blade means in the proper vertical adjusted position.

As seen in FIGS. 2 and 10, the lower end portion 180 of the retractor blade means tapers through the outermost tip 182 thereof so that the lower end of the retractor blade means is of flexible construction providing built-in resilience to avoid tissue necrosis in use.

Referring now to FIGS. 5 - 8 inclusive, a modified form of support means is indicated generally by reference numeral 200 and includes a body means 202 formed of a suitable plastic or the like. This body means has a recess 204 formed therein, and an integral detent rib 206 extends downwardly into this recess. This recess is adapted to slidably receive a support arm and retractor blade assembly identical with that previously described. The support arm and the retractor blade as illustrated in FIG. 5 have been given the same reference numerals primed as those applied to the similar assembly shown in FIG. 2.

Here again, it is apparent that the support arm and associated blade means may be adjusted by sliding the support arm in and out through the recess 204 of the support means 200 as required.

A depending post means 210 is formed integral with the undersurface of body portion 202 and is of generally cylindrical configuration, this post means having a circumferentially extending groove 212 formed in the outer surface thereof.

The support means 200 includes a lower portion 220 having a central hole 222 formed therethrough which is adapted to receive the portion 210 and to permit relative rotation between the upper and lower portions of the support means. Portion 220 is provided with teeth 224 and 226 extending from opposite sides thereof.

As seen in FIG. 7, the undersurface of the lower portion 220 of this form of the support means is counterbored as indicated at 230, the lower end of post means 210 fitting within this counterbored portion, and a split ring 232 also being disposed within the counterbored portion 230 and fitting within the groove 212 provided in post means 210 to hold the upper and lower portions of the support means in assembled relationship and yet permitting free rotation of the upper body portion 202 of the support means with respect to the lower portion 220.

As seen most clearly in FIG. 6, portion 220 of the support means is adapted to fit within the cavity 52 of arm means 24, the teeth 224 and 226 on this lower portion of the support means engaging the teeth 66 extending into cavity 52. The interengagement of these teeth serves to hold the lower portion of the support means in adjusted relationship relative to the associated arm means, yet the resilience of the material of the components permits the portion 220 to be moved longitudinally within cavity 52 when sufficient force is applied thereto.

The principal distinction of the support means shown in FIGS. 5 - 8 from that previously described is that the support means is formed in two separate portions so that the portion extending outwardly of the cavity and the arm means may rotate so as to adjust the angular relationship of the support means with respect to the associated arm means.

Referring now to FIG. 1 of the drawings, a typical arrangement of the retractor device of the present invention within an incision during a surgical operation is illustrated. One of the support means 100 has been described as operatively mounted with respect to the lower cavity of arm means 40. Similar support means 100' are operatively associated with each of the remaining arm means, and support arms 120' as well as retractor blade means 160' associated with each of these support means is substantially identical with the support arm assembly 120 and the retractor blade means 160.

One support means 200 has been specifically described as operatively associated with the upper cavity of arm means 24. Similar support means 200' are illustrated as being operatively associated with the upper cavity of each of the remaining arm means. Support arms 120' associated with these last-mentioned support means are substantially identical in construction with the support arm 120 previously described, and may be of slightly greater length as illustrated. The retractor blade means 160' associated with each of the support arms connected with support means 200' are identical with the retractor blade means 160 previously described.

As illustrated in FIG. 1, line 250 indicates an incision made in the abdominal wall of a patient, and it will be noted that each of the retractor blade means and associated support arms mounted on a support means operatively connected with the lower cavity of an arm means is engaged with the skin tissue for holding the incision open. It is considered that it is not necessary to have these support arms pivot since the retractor blade means associated therewith can rotate with respect to the support arms, and this portion of the structure is especially adapted for holding the incision open.

The retractor blade means operatively connected with the support arms which are supported by the support means associated with the upper cavity of each of the arm means are illustrated as engaging certain internal organs indicated by line 252 such as the bowels or other organs to hold them out of the way when operating on certain portions of the anatomy. It is considered desirable that these latter support arms be adjustably mounted so that the angularity thereof with respect to the associated arm means can be varied as indicated in FIG. 1. These latter support arms and the associated retractor blade means will automatically pivot into the operative positions shown to accommodate to the configuration of the tissues engaged by the retractor blade means.

It should of course be understood that all of the support arms may be supported by support means including pivotally mounted portions, or all of the support arms may be disposed in fixed angular relationship to the associated support means, and various combinations of these arrangements may be employed as desired.

Referring now to FIG. 14 of the drawings, a modified arm means 260 is provided which is of less height than the aforedescribed arm means. This construction would of course result in lowering of the amount which the retractor apparatus would project in an upward direction above the wound thereby having less tendency to get in the way of the surgeon's hands as he carries out the operation. It also provides greater resistance to torsion when pressure is applied thereto.

In the cross-sectional illustration of arm means 260 as seen in FIG. 14, a body 262 formed of plastic or a similar substance is provided with a pair of longitudinally extending cavities 266 and 268 which are disposed in side-by-side relationship with respect to one another. These cavities are separated from one another by a central wall portion 270 formed integral with the arm means. Cavities 266 and 268 are in communication with longitudinally extending slots 274 and 276 respectively which are coextensive in length with the cavities and which open through the lower and upper surfaces of the arm means respectively. It will be noted that in this arrangement the slots are offset with respect to one another whereas in the previously described embodiments the slots are vertically aligned with one another. Both the cavities and the slots open through opposite ends of the associated arm means.

As in the previously described modifications, the body means includes integral teeth 280 of generally triangular cross sectional configuration which extend inwardly from opposite sides of the cavity 266 to serve as detent means to cooperate with a support means as previously described. In a similar manner, integral teeth 282 extend inwardly into the cavity 268.

The arm means 260 as illustrated in FIG. 14 may be employed in the same manner as the arm means previously described, similar support means, support arms and blade means being employed therewith.

Referring now to FIG. 15, a modified connecting means is indicated generally by reference numeral 290. This connecting means is also formed of plastic and preferably comprises a one-piece construction. The connecting means includes a lower generally rectangular portion 292 having teeth 294 extending from one side thereof.

The opposite side of the lower portion of the connecting means is provided with a pair of portions 296 and 298 of reduced dimension extending outwardly from the lower portion and defining an arcuate surface 300 therebetween. These resilient portions 296 and 298 are adapted to engage one side wall of a cavity within an associated arm means which is preferably smooth, or not provided with teeth so as to continuously resiliently urge the teeth 294 at the opposite side of the lower portion of the connecting means into engagement with cooperating teeth formed at one side of the cavity in the associated arm means.

The lower portion of the connecting means is connected by a post 304 of generally square cross-sectional configuration with an upper portion 308 of similar configuration to the lower portion 292. The upper portion 308 has teeth 310 formed integrally at one side thereof.

The opposite side of the upper portion 308 is provided with a pair of resilient portions 312 and 314 of reduced dimension which extend outwardly therefrom and which are joined by an arcuate surface 316.

As is the case with the lower portion, the resilient portions 312 and 314 are adapted to cooperate with a smooth side of a cavity in an associated arm means and to continuously urge the teeth 310 at the opposite side of the upper portion of the connecting means into engagement with cooperating teeth formed on one side of the associated cavity in the arms means.

Referring now to FIG. 16, a modified form of support means is illustrated wherein the lower portion 320 of a support means is actually a modified embodiment of the lower portion 220 of a combined support means as previously described and illustrated in FIGS. 5-8 of the drawings.

The lower portion 320 of the support means includes a body portion 322 having a central hole 324 formed therethrough corresponding to the hole 222 previously described. A plurality of teeth 326 extend from one side of the body portion 322.

A pair of integral outwardly extending portions 330 and 332 of reduced dimension are formed at the opposite side of the body portion 322 and are interconnected by an arcuate surface 334.

Referring now to FIG. 17, a modified arm means is indicated generally by reference numeral 340 and is provided with a cavity 342 extending longitudinally thereof. One side 344 of the cavity is of relatively smooth construction, while the opposite side of the cavity is provided with a plurality of inwardly directed teeth 344 which are adapted to cooperate with and engage the teeth 326 provided on the support means.

As seen in FIG. 17, a depending post 336 corresponding to the post 210 previously described is illustrated as being received within the hole provided in the body portion 322. The resilient portions 330 and 332 have been deformed as compared with the relaxed position shown in FIG. 16 whereby these resilient portions will continuously bias the body portion 322 to the left as seen in FIG. 17 thereby urging the teeth 326 into engagement with the teeth 346 formed on the arm means.

It is apparent that the resilient portions of this form of the support means will continuously interengage the detent means, and when it is desired to move the support means, the upper portion thereof will be grasped so as to move the support means to the right as seen in FIG. 17 thereby disengaging the teeth 326 from the teeth 346 so that the support means may be moved longitudinally with respect to the arm means. When the support means is then released, the resilient portions 330 and 332 will again bias the teeth into interengagement with one another to hold the support means in the desired operative position.

Referring now to FIG. 18, a further modified form of the invention is illustrated wherein a support arm indicated generally by reference numeral 350 includes a first portion 352 having a plurality of transverse recesses 354 formed in the upper surface thereof which are adapted to receive the detent rib provided in an associated support means in the manner previously described in connection with support arm 120 for example. This portion 352 of the support arm is adapted to slide within a recess formed in the associated support means, and the outer end (not shown) of portion 352 may be provided with ears for facilitating manual grasping thereof.

The inner end of support arm 350 is provided with a downwardly turned portion 360 which in turn is connected with an integral depending portion 362 of reduced diameter.

The depending portion of the support arm is indicated generally by reference numeral 364 and includes an upper portion 370 having a bore 372 formed therethrough, this bore snugly receiving depending portion 362 of the support arm. A snap ring 374 fits within a groove 376 provided in the lower part of portion 362 for holding depending portion 364 of the support arm in place. The support arm includes a cutout portion 378 to provide clearance with the snap ring, whereby the depending portion 364 may readily rotate through an angle of 360° with respect to portion 362.

A depending portion 364 includes a body 380 having a pair of rows of spaced detent projections 382 similar to those described in connection with the depending portion 130 previously described whereby a retractor blade means may be adjustably supported thereon.

It is apparent that the support arm as illustrated in FIG. 18 will function in the same manner as that shown in FIG. 2 for example. However, the arrangement as shown in FIG. 18 will provide greater rigidity when traction is applied to the apparatus. The remaining structure of member 380 below that shown in FIG. 18 will be similar to the bottom portion of the depending portion of the support arm shown in FIG. 9.

It is apparent from the foregoing that there is provided according to the present invention a new and novel retractor device for use in surgical operations wherein the retractor blade means and the associated support arms are adjustable along the sections or arm means of the device, the sections or arm means themselves being adjustable with respect to one another. This enables full adjustment of the apparatus and equal or balanced traction forces may be provided around all portions of the incision. The angular position of certain of the support arms may be adjusted with respect to the associated arm means, and the various retractor blade means are pivotally mounted so as to automatically move into proper position to conform to the configuration of the tissues with which they are engaged. The retractor blade means provide a relatively large surface of contact with the associated tissues, and the retractor blade means are vertically adjustable with respect to the support arms on which they are mounted. The retractor blade means additionally provides a flexible tip portion to diminish the possibility of tissue necrosis. The over-all arrangement is relatively easy to adjust, and the provision of all of the components of plastic or a similar substance enables the apparatus to be pre-sterilized and packaged and then thrown away after use.

As this invention may be embodied in several forms without departing from the spirit or essential characteristics thereof, the present embodiment is therefore illustrative and not restrictive, and all changes that fall within the metes and bounds of the invention or that form its functional as well as conjointly cooperative equivalents are therefore intended to be embraced.

I claim:

1. A retractor device comprising: a frame means including separate spaced apart adjustable sections defining an opening therewithin; at least two oppositely disposed support means movably supported on said frame means; at least one additional support means movably supported on said frame means; means on said frame means and at least said additional support means for moving at least said additional support means up to and past the other said support means on said frame means; means on said frame means and each of said support means for holding said support means in adjusted position on said frame means; a support arm supported by each said support means and extending therefrom; and retractor blade means supported by said support arms.

2. Apparatus as defined in Claim 1 wherein said means for holding said support means in adjusted position on said frame means comprises integral detent means formed on said support means and further integral detent means formed on said frame means.

3. Apparatus as defined in Claim 1 wherein said frame means has an elongated longitudinally extending cavity formed therein receiving a portion of said support means, and cooperating detent means formed in said cavity and on said portion of the support means comprising said means for holding the support means in adjusted position.

4. Apparatus as defined in Claim 3 wherein said frame means has a slot formed therein of reduced dimension as compared to said cavity and providing communication with said cavity, a part of said support means extending through said slot.

5. Apparatus as defined in Claim 1 wherein said frame means has an elongated longitudinally extending cavity formed therein, said support means including a first portion disposed within said cavity, said means for holding the support means in adjusted position relative to said frame means comprising detent means formed in said cavity and on said first portion of the support means, said support means including a second portion extending outwardly of said cavity and said frame means, said second portion having a recess formed therein, said support are being slidably positioned within said recess.

6. Apparatus as defined in Claim 5 wherein said recess has formed therein detent means, said support arm having detent means cooperating with said last detent means for holding said support arm in adjusted position relative to said second portion of the support means.

7. Apparatus as defined in Claim 1 wherein said support arm includes a first portion supported by said support means, said support arm including a second depending portion movably mounted with respect to the first portion of the support arm to permit angular adjustment of the blade means with respect to the associated support means and said frame means so that the blade means automatically conforms to the configuration of the tissue with which it is engaged.

8. Apparatus as defined in Claim 7 wherein said blade means is slidably mounted on said depending portion of the support arm.

9. Apparatus as defined in Claim 8 including cooperating detent means formed on the depending portion of said support arm and said blade means for holding the blade means in position relative to the support arm.

10. Apparatus as defined in Claim 1 wherein the lowermost terminal end of the blade means is tapered to a reduced dimension at the outer end thereof so as to provide a flexible tip portion on the blade means adapted to conform to the configuration of the tissue with which it is engaged.

11. Apparatus as defined in Claim 1 wherein each of said sections of said frame means is provided with a longitudinally extending cavity formed therewithin, and connecting means including spaced portions adapted to fit within the cavity of two adjacent sections to interconnect the sections of the frame means.

12. Apparatus as defined in Claim 11 wherein said spaced portions of the connecting means have detent means thereon, each of the cavities within said sections of the frame means having cooperating detent means for holding the adjacent sections in adjusted position relative to one another.

13. Apparatus as defined in Claim 12 wherein each of said sections of said frame means includes a slot of reduced dimension as compared with the cavity in the section, each of said slots providing communication with the associated cavity, said connecting means including post means interconnecting said spaced portions thereof, said post means being slidably disposed within the slots of two adjacent sections of said frame means.

14. Apparatus as defined in Claim 1 wherein the means for moving at least said additional support means up to and past the other of said support means on said frame means includes a pair of longitudinally extending cavities formed in each of said sections of said frame means, each of said sections having a pair of slots formed in the upper and lower surfaces thereof, said slots being of reduced dimension as compared with the associated cavities, each of said slots being in communication with one of said cavities, each of said cavities having a plurality of teeth formed along opposite sides thereof, said support means including teeth formed on a portion thereof adapted to engage the teeth in the associated cavity of one of said sections to comprise the means for holding the support means in adjusted position relative to the associated frame means.

15. Apparatus as defined in Claim 1 wherein said frame means has a longitudinally extending cavity formed therewithin, said support means comprising a first portion disposed within said cavity, said cavity having a plurality of teeth formed therein, said first portion of the support means having teeth formed therein adapted to engage the teeth within said cavity to comprise the means for holding said support means in adjusted position relative to said frame means, said support means including a second portion extending outwardly of said cavity and said frame means, said second portion having a recess formed therein receiving the associated support arm, said support arm being slidable within said recess, said recess having a rib formed therein, said support arm having a plurality of recesses formed in a surface thereof for receiving said rib to hold the support arm in position relative to the support means.

16. Apparatus as defined in Claim 15 wherein said second portion of the support means is fixed with respect to the first portion of the support means.

17. Apparatus as defined in Claim 15 wherein said second portion of the support means is pivotally mounted with respect to the first portion of the support means.

18. Apparatus as defined in Claim 15 wherein said support arm includes a depending portion pivotally mounted with respect to the remaining portion of the support arm, said blade means being supported on said depending portion so that the blade means is adapted to automatically conform to the configuration of the tissue with which it is engaged.

19. Apparatus as defined in Claim 18 wherein said blade means is slidably mounted on said arm, said depending portion of the support arm and said blade means having a plurality of spaced detent portions adapted to engage one another for holding the blade means in adjusted position with respect to the depending portion of the support arm, and means for limiting the movement of said blade means with respect to the depending portion of the support arm.

20. Apparatus as defined in Claim 1 wherein said means for moving at least said additional support means up to and past the other of said support means on said frame means includes a pair of longitudinally extending cavities formed in each section of said frame means, each of said sections including a pair of slots of reduced dimension compared with said cavities, each of said slots being in communication with one of said cavities, one of said slots opening through the upper portion of the associated section and the other of said slots opening through the lower portion of the associated section, each of said cavities having detent means formed therein, a plurality of support means, each of said support means including a first portion movably supported within an associated cavity and having detent means thereon adapted to engage the detent means in the associated cavity to comprise the means for holding the associated support means in adjusted position with respect to the associated frame means, each of said support means including a second portion extending outwardly of the associated cavity and frame means, said second portion of each of said support means including a recess, a support arm slidably disposed within each of said recesses, detent means for holding each support arm in adjusted position relative to the associated support means, each of said support arms including a depending portion pivotally mounted with respect to the remaining portion of the associated support arm, a blade means slidably mounted on each of said depending portions of said support arms, and detent means for holding each blade means in adjusted position with respect to the associated depending portion of the support arm.

21. Apparatus as defined in Claim 1 wherein said means for moving at least said additional support means up to and past the other of said support means on said frame means a pair of longitudinally extending cavities formed in each section of said frame means in side-by-side relationship with one another, each of said sections of said frame means having a pair of slots, one of said slots being formed in the upper surface of the frame means and the other of the slots being formed in the lower surface of the frame means, each of said slots being of reduced dimension as compared with the associated cavities, each of said slots being in communication with approximately the medial portion of the associated cavity whereby the slots are offset with respect to one another.

22. Apparatus as defined in Claim 21 wherein each of said cavities has a plurality of teeth formed along at least one side thereof, said support means including teeth formed on a portion thereof and adapted to engage the teeth in the associated cavity of one of said sections to comprise a means for holding the support means in adjusted position relative to the associated section of the frame means.

23. Apparatus as defined in Claim 1 wherein said means for holding said support means in adjusted position on the associated frame means comprises teeth means formed on one side of said support means, said frame means having a cavity formed therein receiving said support means, a plurality of teeth being formed along one side of said cavity for engaging the teeth means on said support means, the side of said support means opposite from said teeth means including resilient means engaging the opposite side of said cavity for biasing the teeth means of the support means into engagement with the teeth formed at said one side of the cavity.

24. Apparatus as defined in Claim 23 wherein said resilient means includes at least one integral portion of said support means of reduced dimension and extending therefrom and adapted to be deflected so as to resiliently urge the teeth means of the support means into interengagement with the teeth at said one side of the cavity.

25. Apparatus as defined in Claim 23 wherein said resilient means comprises a pair of integral support means portions extending therefrom and being of reduced dimension and being sufficiently resilient so as to be deflected when in operative position to thereby continuously resiliently urge the teeth means of said support means into engagement with the teeth formed at said one side of the cavity within which the support means is disposed.

26. Apparatus as defined in Claim 1 wherein each of said sections of said frame means is provided with a longitudinally extending cavity formed therewithin, connecting means including spaced portions adapted to fit within the cavity of two adjacent sections to interconnect the sections, spaced portions of said connecting means having detent means thereon, each of said cavities within said sections having cooperating detent means for holding the adjacent sections in adjusted position relative to one another, each of said spaced portions of the connecting means having resilient means disposed oppositely to said detent means thereon for resiliently urging the detent means into engagement with the cooperating detent means within an associated cavity.

27. Apparatus as defined in Claim 26 wherein said resilient means on each of said spaced portions of the connecting means comprises at least one resilient portion of reduced dimension extending from said portion of the connecting means and adapted to continually bias the detent means of the connecting means into interengagement with a detent means in an associated cavity.

28. Apparatus as defined in Claim 26 wherein said resilient means comprises a pair of integral portions on each of said spaced portions of the connecting means and being of reduced dimension and extending therefrom for continuously biasing the detent means on one of said spaced portions into interengagement with the cooperating detent means in an associated cavity.

29. A retractor device as in Claim 1 wherein said frame means has an upper surface and a lower surface; said oppositely disposed support means being mounted on said lower surface and said at least one additional support means being mounted on said upper surface, said means for moving at least said additional support means up to and past the other of said support means being on the upper surface of said frame means.